United States Patent [19]
Marier et al.

[11] Patent Number: 5,660,245
[45] Date of Patent: Aug. 26, 1997

[54] SNOWMOBILE

[75] Inventors: Gregory J. Marier; Tommy O. Moats; Kazuyoshi Takada, all of Coon Rapids, Minn.

[73] Assignee: Yamaha Hatsudoki Kabushiki Kaisha, Iwata, Japan

[21] Appl. No.: 198,762

[22] Filed: Feb. 18, 1994

[51] Int. Cl.⁶ .................................................. B62M 27/02
[52] U.S. Cl. ...................................... 180/190; 180/9.25
[58] Field of Search ........................... 180/190, 182, 180/186, 191, 193, 9.1, 9.23, 9.25, 9.42, 9.5, 9.54; 74/15.63, 15.6, 15.2, 15.66, 15.84, 11, 15; 474/8

[56] References Cited

U.S. PATENT DOCUMENTS

| | | | |
|---|---|---|---|
| 3,578,095 | 5/1971 | Hauser | 180/190 |
| 3,698,497 | 10/1972 | Bombardier | 180/190 |
| 3,870,115 | 3/1975 | Hase | 180/190 |
| 3,871,460 | 3/1975 | Dehnert | 180/190 |
| 4,008,777 | 2/1977 | Juto et al. | 180/182 |
| 4,337,958 | 7/1982 | Witt et al. | 180/190 |
| 4,593,921 | 6/1986 | Marier | 280/21.1 |
| 4,620,604 | 11/1986 | Talbot | 180/190 |
| 5,172,786 | 12/1992 | Ishibashi et al. | 180/190 |
| 5,279,381 | 1/1994 | Fukada | 180/190 |
| 5,372,215 | 12/1994 | Fukuda | 180/190 |

FOREIGN PATENT DOCUMENTS

| | | |
|---|---|---|
| 4715776 | 6/1972 | Japan. |
| 5547977 | 4/1980 | Japan. |
| 5918083 | 1/1984 | Japan. |
| 61-238564 | 10/1986 | Japan. |
| 1289792 | 11/1989 | Japan. |

*Primary Examiner*—Kevin Hurley
*Attorney, Agent, or Firm*—Knobbe, Martens, Olson & Bear LLP

[57] ABSTRACT

A snowmobile construction wherein the components are laid out so as to improve the center of gravity of the snowmobile and position the major components so that they will exert a large portion of their weight on the drive belt. The snowmobile includes a built-up frame assembly that defines a cradle in which the engine is positioned and which drives the drive belt through a pair of transmissions. One of these transmissions is disposed within the frame assembly and in a casing carried by an opening in one side of the frame assembly. The snowmobile is steered by a steering shaft that extends across the top of the engine and through a space between the exhaust manifold of the engine and the engine so as to provide a compact assembly. The positioning of the transmission inboard of the frame permits the use of a forwardly positioned seat with foot rests disposed outwardly of the transmission but closely adjacent the sides of the frame.

57 Claims, 6 Drawing Sheets

SNOWMOBILE

BACKGROUND OF THE INVENTION

This invention relates to a snowmobile, and more particularly, to an improved drive and frame arrangement for a snowmobile.

Conventionally, snowmobiles have a frame assembly that supports, at the forward portion thereof, an internal combustion engine and a transmission that drives a drive belt positioned beneath the frame assembly and upon which the frame assembly is supported. A seat is carried by the frame assembly and generally overlies the drive belt. A pair of front skis are also carried by the frame assembly and are dirigibly supported for steering by a rider seated on the seat.

The drive belt generally is quite wide so as to improve stability and the transmission of power to the ground so as to propel the snowmobile. Of course, this means that the transmission for the drive belt must be disposed at a side of the drive belt and this driving transmission is driven from the engine in any of a variety of fashions. The rider, as is typical with this type of vehicle, is seated on the seat in straddle fashion and thus must have a place to position his legs. With the conventional types of drive constructions previously employed, the rider's legs must be splayed quite widely if they are to be disposed on opposite sides of the drive belt and the transmission that drives it. In order to avoid such uncomfortable seating positions, it has been the practice to move the seat rearwardly so that the rider's legs will be disposed behind the transmission driving the drive belt. This gives rise to not only a great length for the snowmobile, but also does not provide the desired balance or handling.

It is, therefore, a principal object of this invention to provide an improved snowmobile drive assembly that permits a more compact arrangement and affords comfortable seating.

It is a further object of this invention to provide a transmission assembly for a snowmobile that cab be positioned in a compact nature and permit the rider's feet to be placed outside of it without being unduly splayed.

It is a further object of this invention to provide an improved and compact drive assembly for a snowmobile.

Obviously, the frame assembly must support the engine and also accommodate the transmission. Conventionally, the frame assemblies include a pair of side members and the rider places his feet on footrests disposed outwardly of these side members. Because of the fact that the transmission assembly that drives the drive belt must be disposed at one side of the drive belt and outwardly therefor, it has heretofore been the practice to provide this transmission on the outside of the frame. This requires the rearward positioning of the rider and the other problems as aforenoted.

It is, therefore, a still further object of this invention to provide an improved frame assembly for a snowmobile that permits a compact assembly and permits a forwardly positioned rider.

It is a further object of this invention to provide an improved frame assembly for a snowmobile wherein the frame side members form, at least in part, the transmission case for the drive belt transmission.

As has been noted, the snowmobile typically employs a pair of front skis that are steered by a steering mechanism operated by the rider seated on the seat. This steering mechanism includes a steering column that is rotatably supported by the frame assembly and which generally is inclined upwardly and rearwardly from its forward connection to the steering skis. As a result of this disposition of the steering column, it has heretofore been the practice to position the engine either forwardly and/or above the steering column. This gives rise to added length to the snowmobile and also raises the center of gravity, which is not particularly desirable from a handling standpoint and from a stability standpoint.

It is, therefore, a still further object of this invention to provide an improved and compact steering arrangement for a snowmobile.

It is a further object of this invention to provide a steering arrangement for a snowmobile but permits the engine to be mounted low in the frame and thus maintain a low center of gravity.

The aforenoted types of steering constructions in which the steering column passes beneath and to the rear of the engine also causes the engine and a major portion of the transmission to be forwardly located. This tends to add to the weight on the front skis and reduce the amount of weight concentrated on the drive belt. As a result, traction can be decreased with this type of construction.

It is, therefore, a still further object of this invention to provide an improved engine and steering arrangement for a snowmobile that permits the engine to be located rearwardly and more over the drive belt than previous types of construction.

It has already been noted that the drive belt of a snowmobile is driven by a transmission from the engine. The drive belt transmission contains a drive belt drive shaft carrying a number of drive belt driving members that are engaged with the forward inner portion of the drive belt for driving it. This shaft obviously rotates about a transversely extending axis, and it has been the normal practice in snowmobiles to mount the engine so that its output shaft also rotates about a transversely extending axis. This means that with multiple cylinder engines that the exhaust manifold for the engine will also extend transversely. As a result, the exhaust system must reroute the exhaust gases from a transverse direction to a position wherein the exhaust gases can be discharged to the atmosphere and generally rearwardly of the engine. In other words, the exhaust system for the engine also extends the length of the engine assembly, either in a forward or rearward direction. This further compromises the location for the steering column.

It is, therefore, a still further object of this invention to provide an improved steering and engine arrangement for a snowmobile that permits a compact assembly.

It is a further object of this invention to provide an exhaust system and steering arrangement for a snowmobile wherein the steering column may pass between a portion of the exhaust system and the engine to occupy otherwise dead space and afford a compact arrangement.

Attendant to the transverse positioning of the engine in the snowmobile is also the requirement that the induction system extend either forwardly or rearwardly from the engine. This further complicates the layout of components of the snowmobile and can result in excess forward weight bias and added length for the snowmobile. As noted above, both of these features are relatively undesirable.

It is a still further object of this invention to provide an improved compact snowmobile arrangement that incorporates an induction system that can be interrelated to other components to afford a compact construction without unduly affecting the center of gravity.

It is a further object of this invention to provide an improved fuel tank and induction system layout for the driving power unit of a snowmobile.

SUMMARY OF THE INVENTION

A first feature of this invention is adapted to be embodied in a snowmobile that is comprised of a frame assembly that includes a pair of spaced-apart side portions that are suspended from a drive belt. An internal combustion engine is disposed at the front of the frame assembly and is supported with its output shaft extending generally transversely relative to the frame side portion. A belt drive shaft is engaged with and drives the drive belt. An intermediate shaft is driven by the engine output shaft by first transmission means, and second transmission means drive the belt drive shaft from the intermediate shaft. The engine output shaft, belt drive shaft, and intermediate shaft all rotate about parallel, transversely extending axes. At least one of the transmission means is positioned substantially entirely within the lateral confines of the frame side portion. A seat is carried by the frame means in proximity to and to the rear of the internal combustion engine. A pair of foot rests are carried by the frame means on opposite sides thereof and positioned to accommodate the feet of a rider seated upon the seat. At least one of the feets rests is spaced transversely outwardly of the one transmission means.

Another feature of the invention is adapted to be embodied in a frame assembly for a snowmobile that is comprised of a first section comprised of a pair of side portions and a top portion having a generally inverted U-shaped cross section adapted to overlie a drive belt. A pair of side members are affixed at the forward ends of the side portions and extend forwardly therefrom for defining a cradle adapted to receive an internal combustion engine for powering the snowmobile. At least one cross member is affixed to and spans the side members.

Still additional features of the invention are adapted to be embodied in a snowmobile that is comprised of frame means, a drive belt suspended by the frame means, and an engine supported by the frame means. Transmission means drive the drive belt from the engine. A seat is carried by the frame means behind the engine and above the drive belt. A pair of dirigible front skis is carried by the frame means.

In accordance with one of these additional features of the invention, steering means are carried by the frame means forwardly of the seat for operation by an operator seated upon the seat for steering of the front skis. The steering means includes a steering shaft that is rotatable about an axis that is upwardly inclined in a rearward direction and that passes over the engine.

In accordance with another of these additional features, the engine has exhaust port means on one side of the engine and an exhaust system is provided for discharging exhaust gases from the exhaust port means to the atmosphere. This exhaust system includes a manifold having a first portion extending away from the one side of the engine, a second portion extending along one end of the engine, and connected to the first portion by a re-entrant portion to define a generally U-shape in top plan view. Steering means are carried by the frame means forwardly of the seat for operation by an operator seated upon the seat for steering of the front skis. The steering means includes a steering shaft rotatable about an axis that extends between the one side of the engine and the re-entrant portion of the exhaust manifold.

In accordance with the final additional feature of the invention, the engine is formed with intake port means on one side thereof, and an induction system is affixed to this one side of the engine for delivering at least an air charge to the intake port means. This induction system includes an air inlet device for drawing atmospheric air. A fuel tank is carried by the frame means for supplying fuel to the engine for its operation. This fuel tank has a generally L-shaped configuration in top plan view and is comprised of a first long-leg section that extends along one side of the engine contiguous to the air inlet device and a second short leg extending from one end of the first long leg towards the one side of the engine and along and offset to one side of the induction system and the air inlet device.

DETAILED DESCRIPTION OF THE PREFERRED EMBODIMENT OF THE INVENTION

Figure 1:
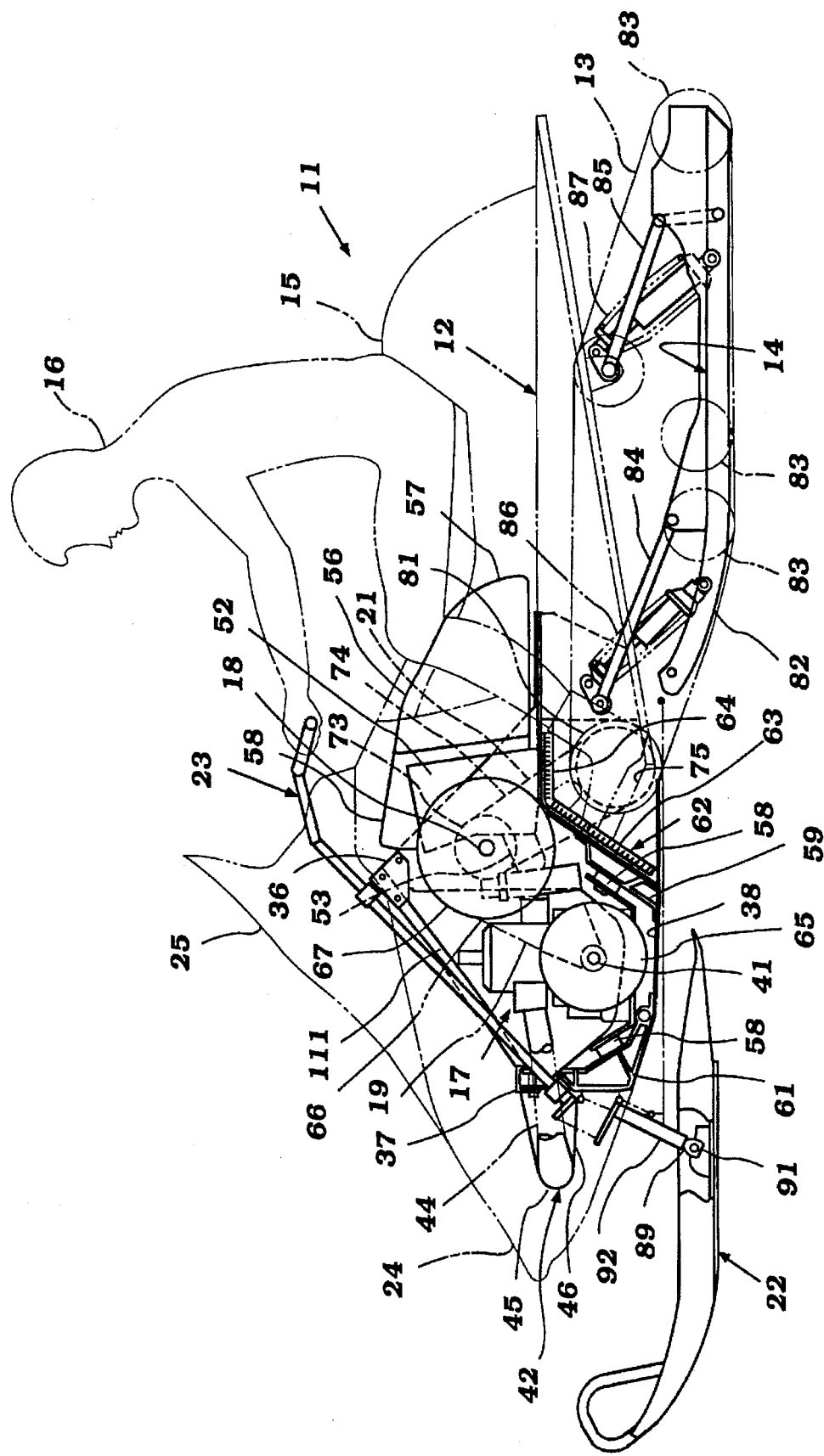
FIG. 1 is a side elevational view of a snowmobile constructed in accordance with an embodiment of the invention, with the body assembly shown in phantom and with portions of the frame assembly shown in phantom so as to more clearly show the construction. In addition, certain portions are broken away.

A snowmobile constructed in accordance with an embodiment of the invention is shown in the drawings and is identified generally by the reference numeral 11. The snowmobile 11 is comprised of a number of main components, including a frame assembly, indicated generally by the reference numeral 12, and which is shown in part in phantom in some of the figures. The frame assembly 12 is suspended on a drive belt 13 by means of a carriage assembly 14. A seat 15 is supported on the frame assembly 12 over the drive belt 13 and carriage assembly 14 and is sized to accommodate a single rider seated in straddle fashion, as is typical in snowmobile practice, with the rider being shown in some of the figures and identified by the reference numeral 16.

An internal combustion engine, indicated generally by the reference numeral 17, is carried by the frame 12 forwardly of the seat 15 in a manner that will be described. The engine 17 drives an intermediate shaft 18 by means of a first transmission, indicated generally by the reference numeral 19, and which is of the variable ratio type and which also includes a centrifugal clutch. The intermediate shaft 18, in turn, drives the drive belt 13 by a second transmission 21, which will also be described later in more detail.

A pair of front skis 22 are supported by a suspension system at the front of the frame assembly 12 and are dirigible for steering of the snowmobile 11. A handlebar assembly 23 is supported forwardly of the rider's seat 15 for steering of the skis 22 in a manner that will be described.

A fiberglass reinforced resinous plastic body 24 is mounted on the frame assembly 12 and has a windshield 25 that is disposed forwardly of the handlebar 23 for protection of the rider 16.

Figure 6:
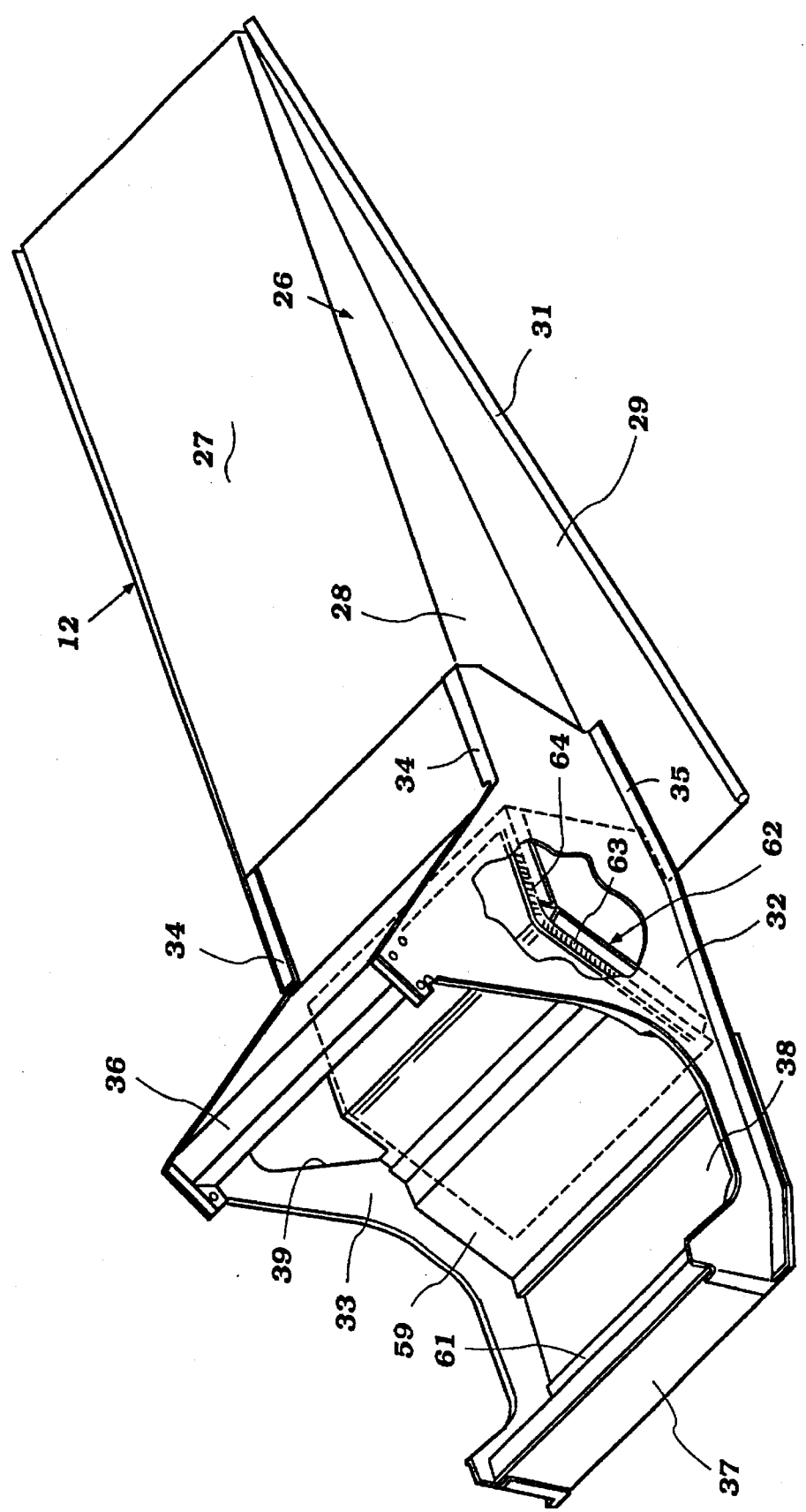
FIG. 6 is an enlarged top plan perspective view of the frame assembly with a portion broken away.

The frame assembly 12 will be now described in more detail by particular reference to FIG. 6. The frame assembly 12 is made up of a fabrication of a number of pieces of aluminum for light weight, although it is to be understood that other materials may be employed or certain portions of the frame assembly may be formed from other materials. Also, the manner of fabrication that is described is only typical, and other methods may be employed for forming the individual components of the frame assembly 12 or its sub-components.

The frame assembly 12 is comprised of a rear portion, indicated generally by the reference numeral 26, and which has a generally inverted U shape with a flat section 27 that tapers generally downwardly in a rearward direction and a pair of side pieces 28. The lower ends of the side pieces 28 are formed with outwardly extending flanges 29 that have their rigidity improved by forming rolled portions 31 at the outer periphery thereof. It should be noted that the side portions 28 have a generally triangular configuration in side elevation, while the cross-sectional shape of the frame portion 26 has an inverted U shape, with the outward legs 29 extending outwardly from the lower ends thereof.

A pair of side plates 32 and 33, which may be formed as stampings, forgings, or the like and which have a generally C-shaped opening at the front end thereof, are affixed in a suitable manner to the front portion of the rear frame member 26. The side plates 32 and 33 may be formed with flanges 34 that overlie the upper surface 26 and lower flanges 35 that overlie the flanges 29 of the frame member 26 so as to add rigidity to the construction. These side members 32 and 33 may be fixed to the frame member 26 by riveting, welding, or the like.

A pair of rectangularly shaped cross members 36 and 37 are affixed between the side plates 32 and 33 and add to their rigidity. These cross members 36 and 37 may be formed as extrusions or the like, also from aluminum alloy. The frame assembly further includes a support plate 38 that extends from the front of the frame member 26 between the side plates 32 and 33 and forwardly to the cross member 37 so as to form a cradle-like configuration in which the engine 17 is mounted in a manner that will be described. The side plate 33 is also formed with a side opening 39 so as to form a case for the transmission 21, as will also be described.

Referring now primarily to FIGS. 1–4, the engine 17 is, in the illustrated embodiment of the two-cylinder in-line type, which operates on a two-stroke crankcase compression principle. As is typical with snowmobile practice, the engine 17 is mounted in the frame assembly 12 so that its crankshaft 41 rotates about a transversely extending axis. In accordance with a feature of the invention, the engine 17 is mounted within the frame assembly 12 so as to be offset to one side of the frame assembly 12, specifically toward the left-hand side in the illustrated embodiment. Although the invention is described in conjunction with a two-cylinder engine operating on a two-stroke crankcase compression principle, it will be obvious to those skilled in the art that certain facets of the invention may be employed with engines of other types. However, the offsetting of the engine 17 to one side of the frame assembly 12 permits the placement of the transmissions for driving the drive belt 13 in the manner to be described.

The engine 17 is also disposed so that its exhaust ports face forwardly, and these exhaust ports deliver the exhaust gases to an exhaust system, indicated generally by the reference numeral 42. This exhaust system includes a manifold 43 having a Y-shaped inlet end that extends to a forwardly extending collector portion 44. This forwardly extending collector portion is disposed axially forwardly of the frame assembly 12, for a purpose to be described, and then merges into a re-entrant or U-shaped section 45. The opposite end of the U-shaped section 45 is connected to an integral expansion chamber 46 that extends along one end of the engine on the right-hand side of the frame assembly 12. The exhaust gases are then introduced to a muffler 47 for silencing and discharge to the atmosphere. It should be noted that the muffler 47 is in essence placed at one side or end of the engine, considering its transverse disposition, and thus this permits a very compact assembly and maximum space utilization without interfering with the serviceability of the components.

An electrical generator, indicated generally by the reference numeral 48, is driven off of the right-hand side of the engine and is interposed between the engine 17 and a recoil starter 49. Again, this construction permits a compact assembly and yet full serviceability of the components.

The engine 17 is provided with an induction system that extends to the intake ports of the engine but rearwardly of the exhaust system 42. This induction system is indicated generally by the reference numeral 51 and includes an air inlet device 52 that draws atmospheric air from an area within the body 24 and forwardly of the legs of the rider 16. This air inlet device 52 may include a silencing arrangement and also an air filter element, which will be readily serviceable because of its positioning forwardly of the seat 16. The thus filtered and silenced air is then delivered by a pair of air supply conduits 53 to a pair of carburetors 54, one for each cylinder of the engine. The carburetors 54 form a fuel/air mixture and discharge this to the intake parts into crankcase chambers of the engine through an intake manifold 55.

Since the engine 17 is offset to the left side of the frame assembly 12, the induction system 51 is also so offset. This permits the use of an L-shaped fuel tank, indicated generally by the reference numeral 56, which is carried by the frame assembly 12 forwardly of and beneath the seat 15. This fuel tank 56 has a generally L-shaped configuration in top plan view and is comprised of a transversely extending portion 57 that extends across the rear surface of the air inlet device 52 and beyond it to a short leg 58 that extends forwardly along the side of the air inlet device 52. Again, this provides a compact, and yet very serviceable, layout for the components of the snowmobile.

The engine 17 is mounted within the cradle formed by the front side members 32 and 33 by elastomeric vibration isolators 58, which are, in turn, connected to front and rear sub-frame assemblies 59 and 61, which are affixed suitably to the panel 38 of the front frame assembly. Thus, the engine 17 is well supported and yet is easily serviceable.

The engine 17 is water cooled and is provided with a cooling jacket and coolant pump, as is well known in this art. There is provided a radiator, indicated generally by the reference numeral 62, which is mounted on the underside of the plate 38 and forwardly of the drive belt 13 so that the drive belt 13 will, in fact, operate as a fan so as to circulate air over the radiator 62 to improve the heat exchange. The radiator 62 actually has a generally angular configuration comprised of a rearwardly inclined, upwardly extending section 63 and a horizontally extending section 64 so as to increase the effective area of the radiator while still maintaining a compact assembly. The tubes of the radiator 62 extend transversely, and the radiator is provided with fins that extend generally longitudinally so as to improve the cooling. In addition, some snow may be thrown onto the radiator 62 by the drive belt 13, and this will further heat exchange from the coolant and further improve the cooling of the engine.

Figure 2:
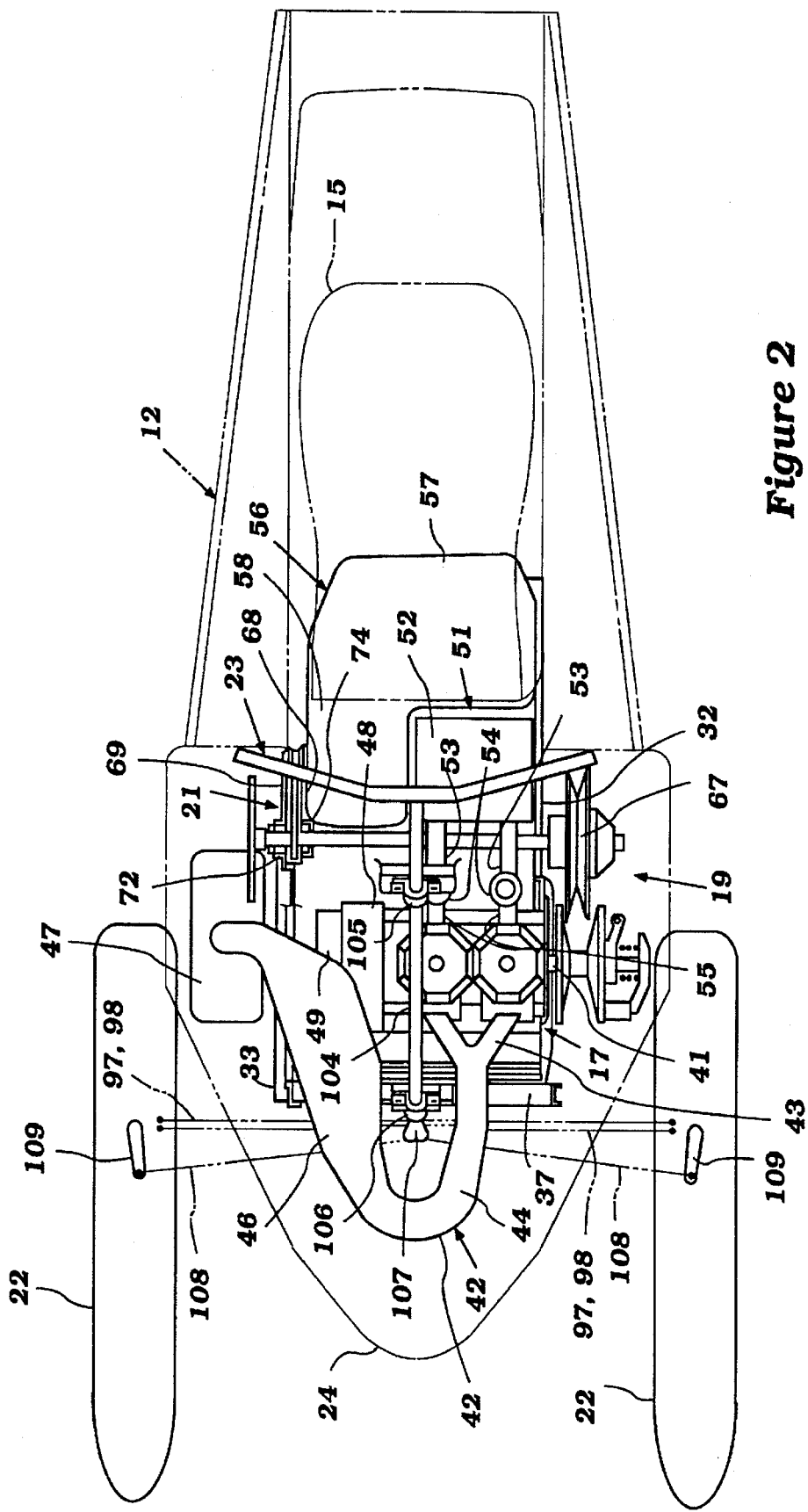
FIG. 2 is a top plan view of the snowmobile with the same portions shown in phantom so as to more clearly show the relationship of the steering engine and transmission arrangement.
Figure 3:
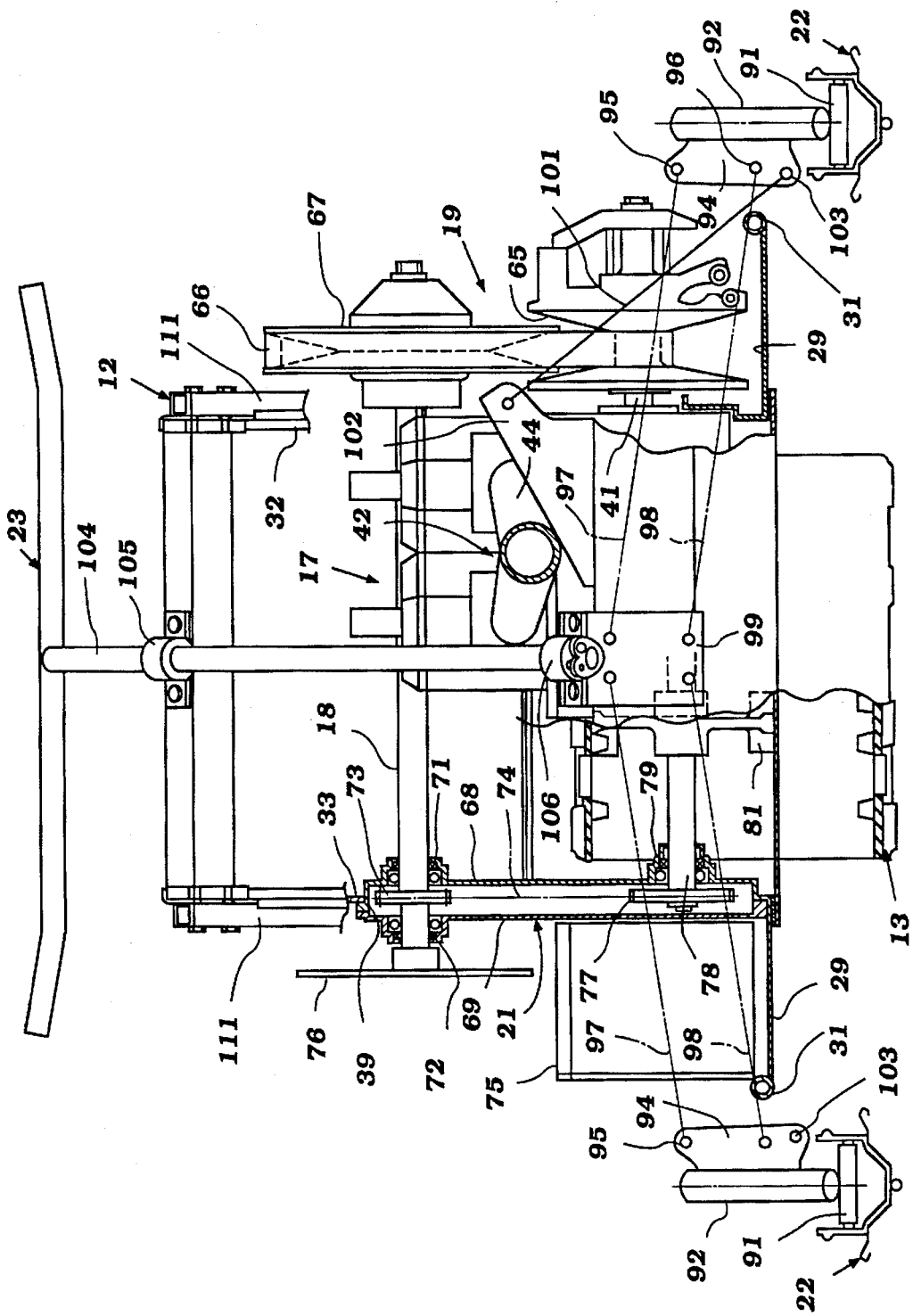
FIG. 3 is an enlarged front elevational view of the snowmobile with portions broken away and shown in section, illustrating the same components as shown in solid lines in the other figures.
Figure 4:
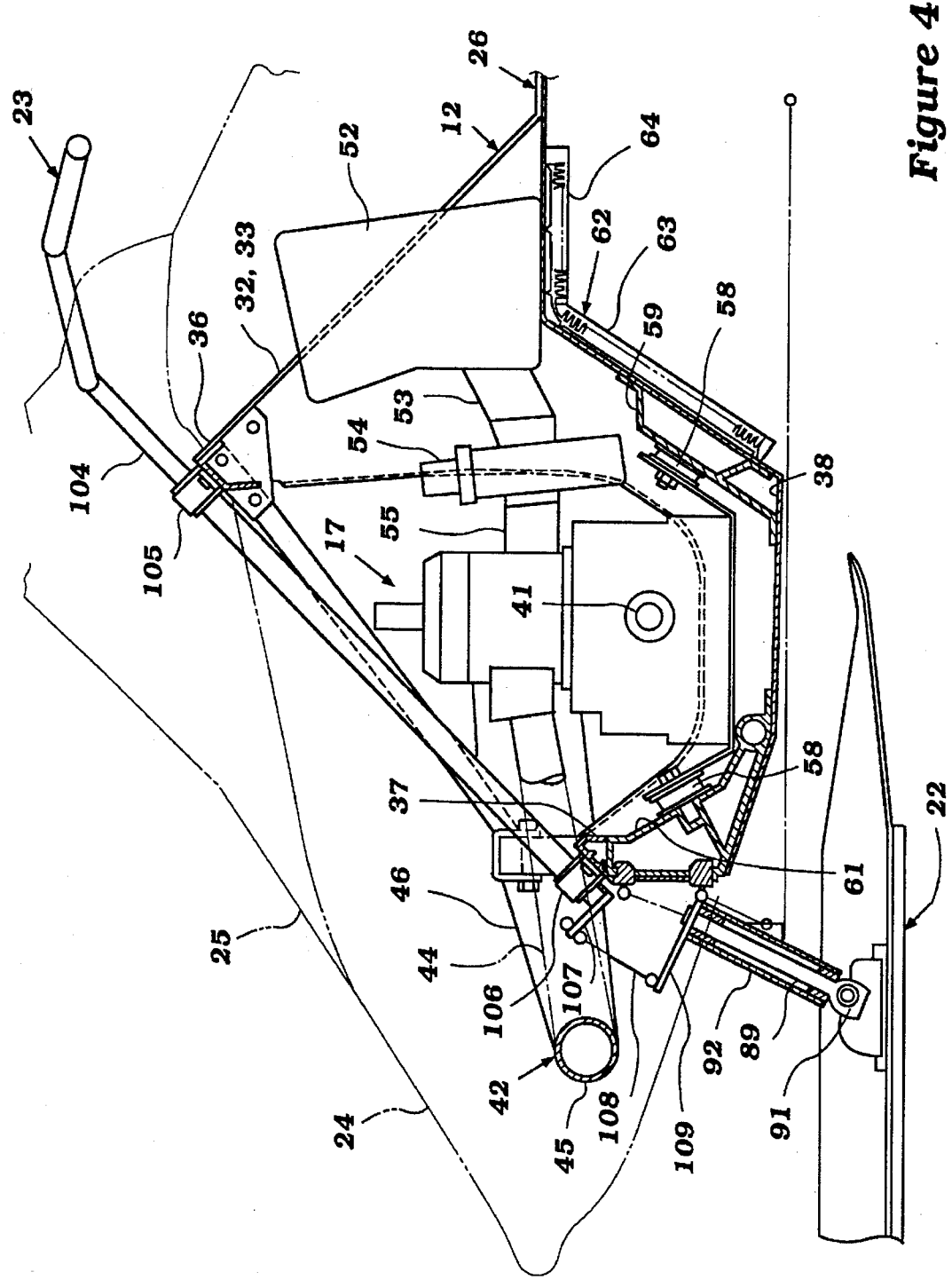
FIG. 4 is an enlarged side elevational view of the forward portion of the snowmobile with additional portions shown in cross section and the transmission removed so as to more clearly show the arrangement for mounting the engine and body.

The drive arrangement for driving the drive belt 13 from the engine crankshaft 41, including the transmissions 19 and 21, will now be described by particular reference to FIGS. 1–3 and 5. Referring first to FIGS. 1–3, wherein the first transmission 19, which is disposed at the left-hand side of the frame assembly 12, is illustrated. This transmission 19 is of the variable speed type and includes a variable pulley 65, which is driven from the crankshaft 41 through a centrifugal clutch (not shown), which can be conveniently positioned within the hub of the variable pulley 65. This variable pulley 65 drives a drive belt 66, which, in turn, is entrained on a fixed pulley 67 that is fixed to the left-hand side of the intermediate shaft 18.

This intermediate shaft 18 is journalled at the left-hand side of the frame assembly 12 in the side plate 32 by a suitable bearing supported thereby the axis d be noted that the axis of the intermediate shaft 18 is disposed above and slightly to the rear of the crankshaft 41, as best seen in FIGS. 1 and 2. This positioning permits the fixed pulley 67 to be disposed forwardly of the rider's legs and in an area where it will not encroach upon them or their foot area. This permits a relatively narrow overall construction for the snowmobile and also permits the engine 17 to be shifted rearwardly in the frame assembly 12 closer to the forward end of the drive belt 13 so as to increase the amount of weight carried by the drive belt 13 and, accordingly, the driving traction.

The intermediate shaft 18 extends across the frame assembly 12 and is parallel to the crankshaft axis 41 and then passes through the opening 39 afore-referred to in the frame side plate 33. A transmission case comprised of a main case member 68 and a cover plate 69 is affixed to the side frame plate 33 and forms an enclosure for the transmission 21. A pair of anti-friction bearings 71 and 72 are carried by the main case member 68 and cover plate 69, respectively, so as to journal the intermediate shaft 18 in the side frame plate 32.

A driving sprocket 73 is formed on the intermediate shaft 18 within the case formed by the member 68 and the cover plate 69, and drives a drive chain 74, which is positioned laterally within the frame side plate 33. This inward placement of the transmission 21 permits the positioning of a pair of foot rests 75 on opposite sides of the frame 12 as somewhat forward extension of the frame member portions 29 that extend forwardly and upwardly so as to permit the rider to place his feet at a convenient position that is not significantly outward of the seat 15, and thus does not require a splayed leg position for the rider. This is true, even though the chain 74 extends between the rider's legs and adjacent his right leg, as clearly seen in the drawings. This also permits the seat 15 to be disposed forwardly from the prior art constructions, and thus permits the rider 16 to be able to have the bulk of his weight directly over the drive belt 13 so as to improve traction.

A brake disk 76 is affixed to the outer end of the intermediate shaft, and a disk brake caliper (not shown) is mounted on the frame assembly in a suitable manner for braking the rotation of the brake disk 76, intermediate shaft 18, and snowmobile in a well-known manner.

The chain 74 is trained at its lower end around a sprocket 77 that is affixed to a belt drive shaft 78. The belt drive shaft 78 is journalled in the cover housing 68 on an anti-friction bearing 79. The opposite end of the belt drive shaft 78 is also appropriately journalled within the frame side plate 32 by a suitable bearing. The belt drive shaft 78 has affixed to it a plurality of belt drive wheels 81, only one of which appears in the figures, and which is engaged with suitable lugs formed on the interior of the drive belt 13 for driving it in a manner well known in this art.

The carriage assembly 14 that suspends the drive belt 13 is comprised of a pair of guide rails 82 that journal a plurality of idler rollers 83 for defining the path of the drive belt 13. A pair of links 84 and 85 are connected to the frame assembly at their upper ends and suspend the guide rails 82 and drive belt 13 for suspension movement relative to the frame assembly 12 in any known manner. Tubular shock absorbers and coil compression springs 86 and 87 are loaded between the frame assembly 12 and the guide rails 82 for cushioning and dampening the suspension movement of the drive belt 13 in a manner well known in this art.

The system for dirigibly suspending the front skis 22 will now be described by particular reference to FIGS. 1–4, and this includes a rod-like member 89 that has a pivotal connection 91 to the respective ski 22, which permits movement of the ski to a limited extent about the pivot pin 91. The pin 89 is journalled for rotation about a steering axis within a cylindrical member 92. The cylindrical member 92 is affixed, as by welding, to a bracket 94, which bracket in turn has a pair of pivotal connections 95 and 96 to one end of respective suspension links 97 and 98. The opposite ends of the suspension links 97 and 98 are pivotally connected to a suspension bracket 99 that is affixed as by welding to the front of the frame cross member 37.

A pair of combined shock absorbers spring assemblies 101 are loaded between suspension brackets 102 affixed to the forward end of the frame side plates 32 and 33 and a pivot connection 103 on the ski brackets 94 so as to dampen the suspension movement of the skis 22 relative to the frame assembly 12.

As has been noted the handlebar assembly 23 is employed for steering the skis 22. To permit this, the handlebar assembly 23 is connected to the upper end of a steering shaft 104 that is disposed at approximately a 45 degree angle to the horizontal and vertical and which extends upwardly from a lower end through the bight formed by the re-entrant portion 45 of the exhaust system 42 for the engine 17 and over the top of the engine 17. In this way, the steering shaft 104 can be conveniently placed in an otherwise void area and will not interfere with any other components. This provides not only a compact assembly but also permits the engine 17 to be mounted low in the frame 12 so as to lower the center of the gravity of the snowmobile 11 as well as permitting the engine 17 to be moved rearwardly so as to improve the center of gravity in a fore and aft direction and to place the bulk of the weight on the drive belt 13 while still maintaining sufficient weight on the front skis 22 for steering purposes.

The steering shaft 104 is journalled at its upper end on by a bearing block 105 that is affixed to the cross member 36 of the frame assembly 12. The lower end of the steering shaft 104 is journalled in a lower bearing block 106 that is affixed to the cross member 37 of the frame assembly 12. The lower end of the steering shaft 104 has affixed to it a steering arm 107 that has a pivotal connection to a pair of drag links 108 at one end of these drag links. The opposite ends of the drag links 108 are connected to a respective steering arm 109 by a pivotal connection so that rotation of the steering shaft 104 will affect rotation of the steering arms 109. These steering arms 109 are, in turn, affixed to the upper ends of the ski support pins 89 so as to rotate them in their cylindrical supports 92 and steer the front skis.

In order to provide further reinforcing for the frame assembly, there are provided a pair of removable cross braces 110 that are affixed by threaded connections at their upper ends to the forwardly extending portions of the side plated 32 and 33 and at their lower ends in the same manner to the lower end extensions of the side plates 32 and 33 of the frame assembly 12. These cross braces can be removed for servicing and yet add great rigidity to the overall frame construction.

Figure 5:
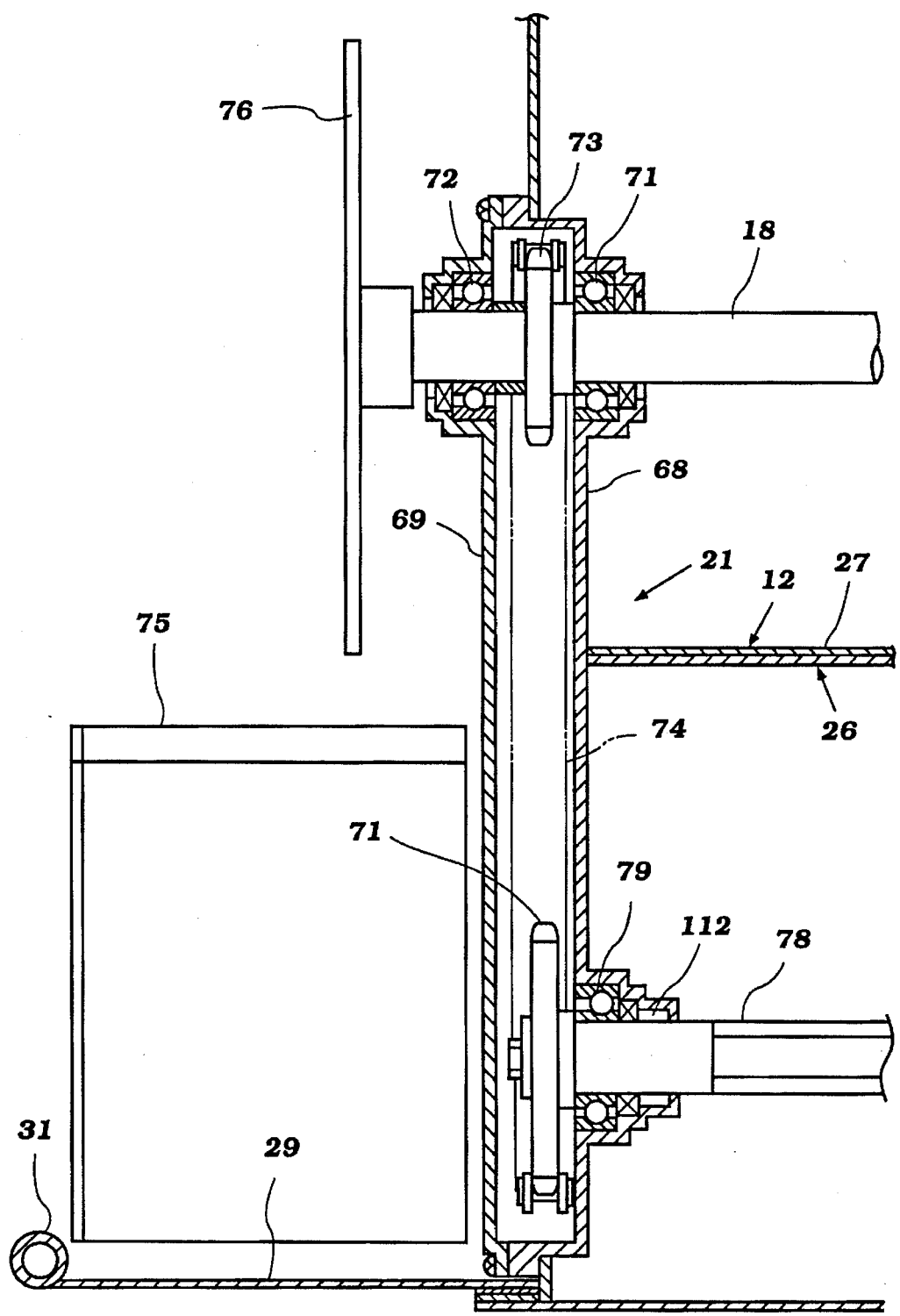
FIG. 5 is an enlarged cross-sectional view showing a portion of the transmission mechanism, which is also shown in FIG. 3.

If desired, the snowmobile 11 may be provided with a speedometer or the like which has a drive associated with the drive belt shaft 78 and which is indicated by the reference numeral 112 in FIG. 5.

It should be readily apparent from the foregoing description that the described snowmobile construction provides an extremely compact assembly and also is very effective in maintaining the center of gravity of the snowmobile very low and also generally over the drive belt 13 so as to improve its traction. In addition, the construction permits the rider's seat to be moved forwardly and permits a reduction in the overall length of the snowmobile without adversely affecting the rider's seating position nor requiring him to splay his legs apart to any significant extent. Of course, the foregoing description is that of a preferred embodiment of the invention and various changes and modifications may be made without departing from the spirit and scope of the invention, as defined by the appended claims.

What is claimed is:

1. A snowmobile comprised of a frame assembly including a pair of spaced-apart side portions suspended from a drive belt, an internal combustion engine disposed at the front of said frame assembly and supported with its output shaft extending generally transversely relative to said side portions, a belt drive shaft engaged with and driving said drive belt, an intermediate shaft driven by said engine output shaft by first transmission means and driving said drive belt shaft by second transmission means, said engine output shaft, said drive belt shaft, and said intermediate shaft being rotatably journalled about parallel transversely extending are, at least one of said transmission means being positioned substantially entirely within the lateral confines of said frame portions, a seat carried by said frame assembly in proximity to and to the rear of said internal combustion engine, and a pair of foot rests carried by said frame means on opposite sides thereof to accommodate the feet of a rider seated upon said seat, one of said foot rests being juxtaposed transversely outwardly of said one transmission means and transmission casing means carried and formed by the one frame side portion and containing the at least one transmission means.

2. A snowmobile as in claim 1, wherein the pair of spaced-apart side portions of the frame assembly comprise a pair of front frame side plates affixed to a generally inverted U-shaped rear frame portion carrying the seat and overlying the drive belt and further including at least one cross frame member extending between said front frame side plates and defining with said front frame side plates a cradle assembly receiving the engine.

3. A snowmobile as in claim 2, wherein one front frame side portion has an opening receiving and forming the transmission casing means.

4. A snowmobile as in claim 3, wherein the opening receives a first transmission case member containing the at least one transmission means and extending inwardly from the one frame side portion and a cover affixed to said transmission case member.

5. A snowmobile as in claim 4, wherein the transmission case cover is readily removable.

6. A snowmobile as in claim 5, wherein the at least one transmission means is disposed between the feet of a rider seated on the seat and with his feet on the foot rests.

7. A snowmobile as in claim 6, wherein the drive belt has a drive element thereon driven by the at least one transmission means and which is disposed at the same vertical height as the foot rests.

8. A snowmobile as in claim 7, wherein the at least one transmission means comprises the second transmission means.

9. A snowmobile as in claim 7, wherein the other transmission means is disposed forwardly of the rider's feet.

10. A snowmobile as in claim 9, wherein the one transmission comprises the second transmission means.

11. A snowmobile as in claim 1, further including a pair of dirigible front skis carried by the frame assembly and steering assembly carried by said frame assembly forwardly of said seat for operation by an operator seated upon said seat for steering said front skis, said steering means including a steering shaft rotatable about an axis that is upwardly inclined in a rearward direction and which passes over the engine.

12. A snowmobile as in claim 11, wherein the pair of spaced-apart side portions of the frame assembly comprise a pair of front frame side plates affixed to a generally inverted U-shaped rear frame portion carrying the seat and overlying the drive belt and further including at least one cross frame member extending between said front frame side plates and defining with said front frame side plates a cradle assembly receiving the engine.

13. A snowmobile as in claim 12, wherein one front frame side plate has an opening receiving the second transmission means.

14. A snowmobile as in claim 13, wherein the opening receives a first transmission case member containing the second transmission means and extending inwardly from the one front frame side plate and a cover affixed to said transmission case member.

15. A snowmobile as in claim 14, further including bearing means carried by the cross frame member for journaling the steering shaft.

16. A snowmobile as in claim 11, wherein the engine has at least one forwardly facing exhaust poet and an exhaust manifold for discharging exhaust gases from said exhaust port to the atmosphere comprising a first portion extending forwardly from the exhaust port, a second portion extending rearwardly and to one side of the engine, and a re-entrant portion interconnecting said first and said second portions of said exhaust manifold and defining a space forwardly of the engine and through which the steering shaft passes.

17. A snowmobile as in claim 16, wherein the engine is disposed in offset relationship toward one side of the frame assembly with the second transmission means being disposed on the other side of the frame assembly.

18. A snowmobile as in claim 17, wherein the exhaust gases are discharged from the exhaust manifold on the other side of the frame assembly.

19. A snowmobile as in claim 16, wherein the engine further has a rearwardly extending induction system including an air inlet device for drawing atmospheric air and a fuel tank carried by said frame means and having a generally L-shaped configuration in top plan view with a long leg extending along the rear of the air inlet device and toward the other side of the frame assembly and a short leg extending along said other side of said frame assembly from said long leg forwardly.

20. A snowmobile as in claim 19, wherein the fuel tank is disposed forwardly of the seat, and the fuel tank and induction system are disposed substantially above the drive belt.

21. A snowmobile as in claim 20, wherein the engine is water cooled and further including a heat exchanger disposed beneath the frame assembly and forwardly of the drive belt for dissipating heat from the coolant of the engine.

22. A snowmobile as in claim 21, wherein the heat exchanger has a first generally angularly inclined vertically extending portion, which terminates at a horizontally extending portion disposed beneath the frame assembly.

23. A frame assembly for a snowmobile comprised of a first member comprised of a pair of side portions and a top portion having a generally inverted U-shaped cross section adapted to overlie a drive belt, a pair of front side plates affixed to the forward ends of said side portions and extending forwardly therefrom for defining a cradle adapted to receive an internal combustion engine for powering the snowmobile and at least one cross member affixed to and spanning said front side plates.

24. A frame assembly for a snowmobile as in claim 23, wherein the side plates have a generally C-shaped configuration in side elevation and wherein the cross-member extends across at least one leg of each of the C-shaped configurations.

25. A frame assembly for a snowmobile as claim 24, further including a second cross-member extending transversely across the other open legs of the side plates.

26. A frame assembly for a snowmobile as in claim 25, further including a sheet metal member affixed to the cross-members and extending between the side plates to form a lower surface of the cradle.

27. A frame assembly for a snowmobile as in claim 26, wherein the engine is supported on a pair of sub-frames affixed to the side plates adjacent the cross-meters.

28. A frame assembly for a snowmobile as in claim 23, further including transmission means for driving the drive belt from the engine mounted in the frame assembly.

29. A frame assembly for a snowmobile as in claim 28, wherein the transmission is contained within a transmission case affixed to the frame assembly.

30. A frame assembly for a snowmobile as in claim 29, wherein one front frame side plates has an opening receiving the transmission case.

31. A frame assembly for a snowmobile as in claim 30, wherein the opening receives a first transmission case member containing the transmission means and extending inwardly from the one front frame member and a cover affixed to said transmission case member.

32. A frame assembly for a snowmobile as in claim 23, further including suspension means for suspending a pair of dirigible front skis from the side plates and means for steering said front skis including a steering shaft journalled by the cross-member.

33. A frame assembly for a snowmobile as in claim 32, including a pair of cross-braces extending between the upper and lower ends of each of the side plates for providing structural reinforcing therefore.

34. A frame assembly for a snowmobile as in claim 32, wherein the side plates have a generally C-shaped configuration in side elevation and wherein the cross-member extends across at least one leg of each one of the C-shaped portions.

35. A frame assembly for a snowmobile as in claim 34, further including a second cross-member extending transversely across the other open legs of the side plates.

36. A frame assembly for a snowmobile as in claim 35, further including a pair of cross-braces extending between the legs of the respective side plates for offering further structural reinforcing.

37. A snowmobile comprised of frame means, a drive belt suspended by said frame means, an engine supported by said frame means, transmission means for driving said drive belt from said engine, a seat carried by said frame means behind said engine and above said drive belt, a pair of dirigible front skis carried by said frame means, and steering means carried by said frame means forwardly of said seat for operation by an operator seated upon said seat for steering of said front skis, said steering means including a steering shaft rotatable about an axis that is upwardly inclined in a rearward direction and that passes over said engine, said engine having at least one forwardly facing exhaust port and an exhaust manifold for discharging exhaust gases from said exhaust port to the atmosphere comprising a first portion extending forwardly from the exhaust port, a second portion extending rearwardly and to one side of the engine, and a re-entrant portion in connecting said first and said second portions of said exhaust minifold and defining a space forwardly of the engine and through which said steering shaft passes.

38. A snowmobile comprised of frame means as in claim 37, wherein the frame means includes a pair of generally C-shaped transversely spaced apart front side plates defining a cradle supporting the engine.

39. A snowmobile comprised of frame means as in claim 38, further including at least one cross member extending transversely across the side plates and providing reinforcing therefor at one of the legs thereof.

40. A snowmobile comprised of frame means as in claim 39, further including a second cross-member extending transversely across the other legs of the side plates.

41. A snowmobile comprised of frame means as in claim 40, further including a sheet metal member affixed to the cross-members and extending between the side plates to form a lower surface of the cradle.

42. A snowmobile comprised of frame means as in claim 41, wherein the engine is supported on a pair of sub-frames affixed to the side plates adjacent the cross-members.

43. A snowmobile comprised of frame means as in claim 37, wherein the engine is offset transversely to one side of the frame means.

44. A snowmobile comprised of frame means as in claim 37, wherein the engine further has a rearwardly extending induction system including an air inlet device for drawing atmospheric air and a fuel tank carried by said frame means and having a generally L-shaped configuration in top plan view with a long leg extending along the rear of the air inlet device and across the frame assembly and a short leg extending from said long leg forwardly.

45. A snowmobile comprised of frame means as in claim 44, wherein the fuel tank is disposed forwardly of the seat, and the fuel tank and induction system are disposed substantially above the drive belt.

46. A snowmobile comprised of frame means as in claim 45, wherein the engine is water cooled and further including a heat exchanger disposed beneath the frame assembly and forwardly of the drive belt for dissipating heat from the coolant of the engine.

47. A snowmobile comprised of frame means as in claim 46, wherein the heat exchanger has a first generally angularly inclined vertically extending portion, which terminates at a horizontally extending portion disposed beneath the frame assembly.

48. A snowmobile comprised of frame means, a drive belt suspended by said frame means, an engine supported by said frame means, transmission means driving said drive belt from said engine, a seat carried by said frame means behind said engine and above said drive belt, a pair of dirigible front skis carried by said frame means, said engine having exhaust port means on one side of said engine, an exhaust system for discharging exhaust gases from said exhaust port means to the atmosphere comprising a manifold having a first portion extending from said exhaust port means away from said one side of said engine, a second portion extending along one end of said engine and connected to said first portion by a re-entrant portion to define a generally U shape in top plan view, and steering means carried by said frame means forwardly of said seat for operation by an operator seated upon said seat for steering of said front skis, said steering means including a steering shaft rotatable about an axis that extends between said one side of said engine and said re-entrant portion.

49. A snowmobile comprised of frame means as in claim 48, wherein frame means comprises a pair of side plates having a generally C-shaped configuration in side elevation and wherein a cross-member extends across at least one leg of one of the C-shaped portions.

50. A snowmobile comprised of frame means as in claim 49, further including a second cross-member extending transversely across the other legs of the side plates.

51. A snowmobile comprised of frame means as in claim 50, further including a sheet metal member affixed to the cross-members and extending between the side plates to form a lower surface of the cradle.

52. A snowmobile comprised of frame means as in claim 51, wherein the engine is supported on a pair of sub-frames affixed to the side plates adjacent the cross-members.

53. A snowmobile comprised of frame means as in claim 48, wherein the engine further has a rearwardly extending induction system including an air inlet device for drawing atmospheric air and a fuel tank carried by said frame means and having a generally L-shaped configuration in top plan view with a long leg extending along the rear of the air inlet device and across and a short leg extending from said long leg forwardly.

54. A snowmobile comprised of frame means as in claim 53, wherein the fuel tank is disposed forwardly of the seat, and the fuel tank and induction system are disposed substantially above the drive belt.

55. A snowmobile comprised of frame means as in claim 54, wherein the engine is water cooled and further including a heat exchanger disposed beneath the frame assembly and forwardly of the drive belt for dissipating heat from the coolant of the engine.

56. A snowmobile comprised of frame means as in claim 55, wherein the heat exchanger has a first generally angularly inclined vertically extending portion, which terminates at a horizontally extending portion disposed beneath the frame assembly.

57. A snowmobile comprised of frame means, a drive belt suspended by said frame means, an engine supported by said frame means, transmission means driving said drive belt from said engine, a seat carried by said frame means behind said engine and above said drive belt, a pair of dirigible front skis carried by said frame means, and steering means carried by said frame means forwardly of said seat for operation by an operator seated upon said seat for steering of said front skis, said engine being formed with intake port means on one side thereof, an induction system affixed to said one side of said engine for delivering at least an air charge thereto and including an air inlet device for inducting atmospheric air, and a fuel tank carried by said frame means for supplying fuel to said engine for its operation, said fuel tank having a generally L-shaped configuration in top plan view comprised of a first long leg section extending along said one side of said engine contiguous to said air inlet device and a second short leg extending from one end of said first leg toward said one side of said engine and along and adjacent to one side of said induction system and said air inlet device.

* * * * *